US011096151B2

(12) United States Patent
Jung et al.

(10) Patent No.: US 11,096,151 B2
(45) Date of Patent: Aug. 17, 2021

(54) METHOD AND APPARATUS FOR MANAGING CHANNEL IN WLAN SYSTEM

(71) Applicant: Samsung Electronics Co., Ltd., Suwon-si (KR)

(72) Inventors: Ha-Kyung Jung, Seoul (KR); Jin-Hyoung Kim, Seongnam-si (KR); Jin-Ho Lee, Seoul (KR)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 16/006,127

(22) Filed: Jun. 12, 2018

(65) Prior Publication Data
US 2018/0359730 A1 Dec. 13, 2018

(30) Foreign Application Priority Data
Jun. 12, 2017 (KR) .................. 10-2017-0073322

(51) Int. Cl.
| H04W 72/04 | (2009.01) |
| H04K 3/00 | (2006.01) |
| H04B 1/10 | (2006.01) |
| G01S 7/02 | (2006.01) |
| H04W 16/14 | (2009.01) |
| H04W 84/12 | (2009.01) |

(52) U.S. Cl.
CPC ............. *H04W 72/04* (2013.01); *G01S 7/021* (2013.01); *G01S 7/023* (2013.01); *H04B 1/1027* (2013.01); *H04K 3/20* (2013.01); *H04K 3/226* (2013.01); *H04K 3/822* (2013.01); *H04K 2203/18* (2013.01); *H04W 16/14* (2013.01); *H04W 84/12* (2013.01)

(58) Field of Classification Search
CPC ..... H04W 72/04; H04W 16/14; H04W 84/12; H04B 1/1027; H04K 3/20; H04K 3/226; H04K 3/822; H04K 2203/18; G01S 7/021; G01S 7/023
USPC ....................................................... 370/329
See application file for complete search history.

(56) References Cited

U.S. PATENT DOCUMENTS

| 2006/0214837 A1* | 9/2006 | Liu .................. G01S 7/021 342/52 |
| 2007/0060065 A1 | 3/2007 | Kruys et al. |
| 2009/0116400 A1* | 5/2009 | Sekiya ............ H04W 72/082 370/252 |

(Continued)

FOREIGN PATENT DOCUMENTS

| JP | 5708645 B2 | 4/2015 |
| JP | 2016111579 A | 6/2016 |

OTHER PUBLICATIONS

Korean Office Action dated Feb. 17, 2021, issued in Korean Application No. 10-2017-0073322.

*Primary Examiner* — Yemane Mesfin
*Assistant Examiner* — Intekhaab A Siddiquee
(74) *Attorney, Agent, or Firm* — Jefferson IP Law, LLP (57) ABSTRACT

Embodiments of the disclosure relate to a fifth generation (5G) or pre-5G communication system for supporting a higher data transmission rate beyond the fourth generation (4G) communication system, such as long term evolution (LTE) are provided. The method for managing a channel in a wireless local area network (WLAN) system includes detecting a radar signal and determining an optimal channel based on history information of a channel and the detected radar signal.

14 Claims, 9 Drawing Sheets

(56) References Cited

U.S. PATENT DOCUMENTS

2014/0378179 A1* 12/2014 Nagai .................. H04W 72/02
455/509
2017/0026845 A1* 1/2017 Garg ..................... H04W 16/10

* cited by examiner

METHOD AND APPARATUS FOR MANAGING CHANNEL IN WLAN SYSTEM

CROSS-REFERENCE TO RELATED APPLICATION(S)

This application is based on and claims priority under 35 U.S.C. § 119(a) of a Korean patent application number 10-2017-0073322, filed on Jun. 12, 2017, in the Korean Intellectual Property Office, the disclosure of which is incorporated by reference herein in its entirety.

BACKGROUND

1. Field

The disclosure relates to channel managing methods and apparatuses in a wireless local area network (WLAN) systems. More particularly, the disclosure relates to a method and an apparatus for managing channels in a wireless local area network (WLAN) system using a centered remote channel monitor in a communication system.

2. Description of Related Art

In order to meet the demand for wireless data traffic soring since the 4th generation (4G) communication system came to the market, there are ongoing efforts to develop enhanced 5th generation (5G) communication systems or pre-5G communication systems. For the reasons, the 5G communication system or pre-5G communication system is called the beyond 4G network communication system or post long term evolution (LTE) system.

For higher data transmit rates, 5G communication systems are considered to be implemented on ultra high frequency bands millimeter wave (mmWave), such as, e.g., 60 GHz. To mitigate pathloss on the ultra high frequency band and increase the reach of radio waves, the following techniques are taken into account for the 5G communication system: beamforming, massive multi-input multi-output (MIMO), full dimensional MIMO (FD-MIMO), array antenna, analog beamforming, and large-scale antenna.

Also being developed are various technologies for the 5G communication system to have an enhanced network, such as evolved or advanced small cell, cloud radio access network (cloud RAN), ultra-dense network, device-to-device (D2D) communication, wireless backhaul, moving network, cooperative communication, coordinated multi-point (CoMP), and interference cancellation.

There are also other various schemes under development for the 5G system including, e.g., hybrid FSK and QAM modulation (FQAM) and sliding window superposition coding (SWSC), which are advanced coding modulation (ACM) schemes, and filter bank multi-carrier (FBMC), non-orthogonal multiple access (NOMA) and sparse code multiple access (SCMA), which are advanced access schemes.

Meanwhile, most of the countries limit the channels available on unlicensed bands for transmitters and receivers, such as IEEE 802.11a, n, or ac-based wireless LAN (WLAN), to a portion of the 5 GHz band or pose additional limitations (requirements) to using some channels. The requirements are intended for spectrum sharing with other transmission/reception technologies or services. For example, in the U.S., part of the unlicensed national information infrastructure (U-NII) is assigned for operating radars. WLAN systems intending to use the radar-operated channels are required to be equipped with functionality to attempt to detect radar signals, and if detected, avoid radar signals. Such requirements are called dynamic frequency selection (DFS) requirements, and frequency bands (e.g., channels) for which this requirement should be observed are called DFS bands (or DFS channels).

Specifically, the DFS requirements are described below.

Wireless transmitters and receivers (collectively referred to as transceivers) are largely divided into master devices and client devices. Master devices come with the feature of radar signal detection and function to control other devices. In a typical implementation, WLAN access points (APs) serve as master devices. Client devices lack the radar signal detection and are unable to initiate communication without a permission from a master device. In a common implementation, WLAN terminals play a role as client devices.

When a communication system intending to use the DFS band starts to operate, the master device detects the presence or absence of a radar signal on the channel that it intends to use during a channel availability check (CAC) time. Upon failing to detect a radar signal with a strength higher than a reference value during the CAC time, the master device may determine to use the corresponding channel and notify the client devices of the determination.

Upon detecting a radar signal whose strength is higher than the reference value, the master device cannot use the corresponding channel during a non-occupancy (NO) period. The master device, after switching to another channel or the NO period elapses, may repeat the process of detecting whether there is a radar signal during the CAC time.

Even while using the DFS band channel, the master device should continue to detect whether a radar signal with a strength higher than the reference value occurs. If a radar signal with a strength higher than the reference value occurs, then the master device needs to allow transmission and reception with all the client devices to be stopped within a channel closing transmission (CCT) time and is required to switch to another channel within a channel move (CM) time. Further, the master device is unable to use the corresponding channel during the NO period.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method and an apparatus for managing channels in a wireless local area network (WLAN) system using a centered remote channel monitor in a communication system.

Additional aspects will be set forth in part in the description which follows and, in part, will be apparent from the description, or may be learned by practice of the presented embodiments.

In accordance with an aspect of the disclosure, a method and an apparatus for managing channels in a WLAN system that may take advantage of a DFS band in a low-cost and efficient way.

In accordance with an aspect of the disclosure, a method for managing a channel in a WLAN system comprises detecting a radar signal and determining an optimal channel based on history information of a channel and the detected radar signal.

In accordance with an aspect of the disclosure, a method for managing a channel in a WLAN system comprises receiving a request for channel information and transmitting optimal channel information determined based on history information about a channel and a detected radar signal.

In accordance with an aspect of the disclosure, a method for managing a channel on an access point (AP) in a WLAN system is provided. The method includes sending a request for channel information to a channel monitor, receiving channel information determined based on channel allocation information indicating information regarding a channel switch of the AP and a radar signal detected from the channel monitor, and performing the channel switch based on the channel information.

In accordance with an aspect of the disclosure, a method for managing a channel on a channel monitor in a WLAN system is provided. The method includes receiving a request for channel information from an AP, determining channel information based on channel allocation information indicating information regarding a channel switch of the AP and a radar signal detected, and transmitting the channel information to the AP.

In accordance with an aspect of the disclosure, an apparatus for managing a channel on an AP in a WLAN system is provided. The apparatus includes a transceiver configured to transmit or receiver data, and at least one processor configured to send a request for channel information to a channel monitor, receive channel information determined based on channel allocation information indicating information regarding a channel switch of the AP and a radar signal detected from the channel monitor, and perform the channel switch based on the channel information.

In accordance with an aspect of the disclosure, an apparatus for managing a channel on a channel monitor in a WLAN system is provided. The apparatus includes a transceiver configured to transmit or receiver data, and at least one processor configured to receive a request for channel information from an AP, determine channel information based on channel allocation information indicating information regarding a channel switch of the AP and a radar signal detected, and transmit the channel information to the AP.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

The following description with reference to the accompanying drawings is provided to assist in comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Before detailing the disclosure, some terms as used herein may be interpreted as follows, for example. However, it should be noted that the disclosure is not limited thereto.

The base station is an entity communicating with a UE and may be denoted base station (BS), nodeB (NB), evolved Node B (eNB), or access point (AP).

The user equipment (UE) (or communication terminal) is an entity communicating with a base station or other UEs, may be denoted UE, mobile station (MS), mobile equipment (ME), device, or terminal.

The centered remote channel monitor may also be denoted a channel monitor.

Figure 1:
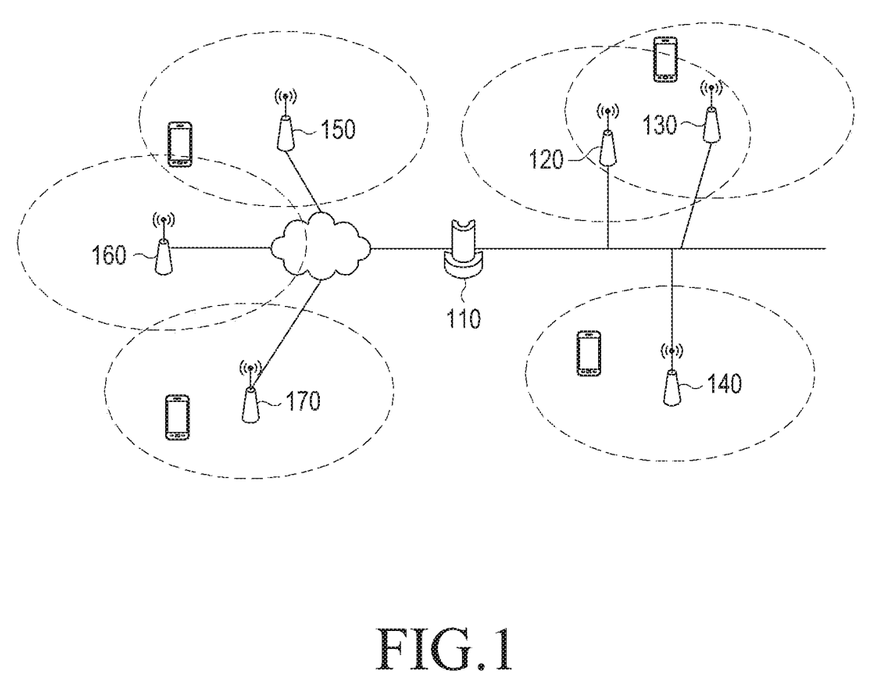
FIG. 1 is a view illustrating a configuration of a wireless local area network (WLAN) system according to an embodiment of the disclosure.

FIG. 1 is a view illustrating a configuration of a WLAN system according to an embodiment of the disclosure.

Referring to FIG. 1, the wireless local area network (WLAN) system includes a centered remote channel monitor 110 and one or more WLAN access points (APs) 120 to 170 connected with the centered remote channel monitor 110 via a network. The centered remote channel monitor 110 may also be referred to as a central channel monitor. The centered remote channel monitor 110 may be located over the same ethernet network as the WLAN APs 120, 130, and 140 or in the same administrative domain as the WLAN APs 150, 160, and 170. The administrative domain may be defined as an area where user datagram protocol (UDP) broadcast or multicast can reach. Since the administrative domain may extend to a remote site on the network topology using such technology as virtual private network (VPN), the devices are not necessarily positioned adjacent to each other on the network topology.

Meanwhile, the centered remote channel monitor and each WLAN AP may be as close in geographical distance to each other as the attenuation of radar signals may nearly be disregarded. However, where the geographical distance between the centered remote channel monitor and each WLAN AP is large enough to cause a significant attenuation of radar signals, the centered remote channel monitor may reflect the degree of attenuation to a threshold in detecting radar signals. Where the centered remote channel monitor and each WLAN AP are far away from each other in such an extent that radar signals may drastically attenuate, the radar signal detection threshold may be offset by the attenuation. According to the disclosure, where the centered remote channel monitor and the WLAN APs are located in the same administrative domain, discovery is possible.

Although the overall description herein illustrates that the centered remote channel monitor is configured separately from the WLAN APs, the WLAN APs may be configured to perform the role of the centered remote channel monitor.

Figure 2:
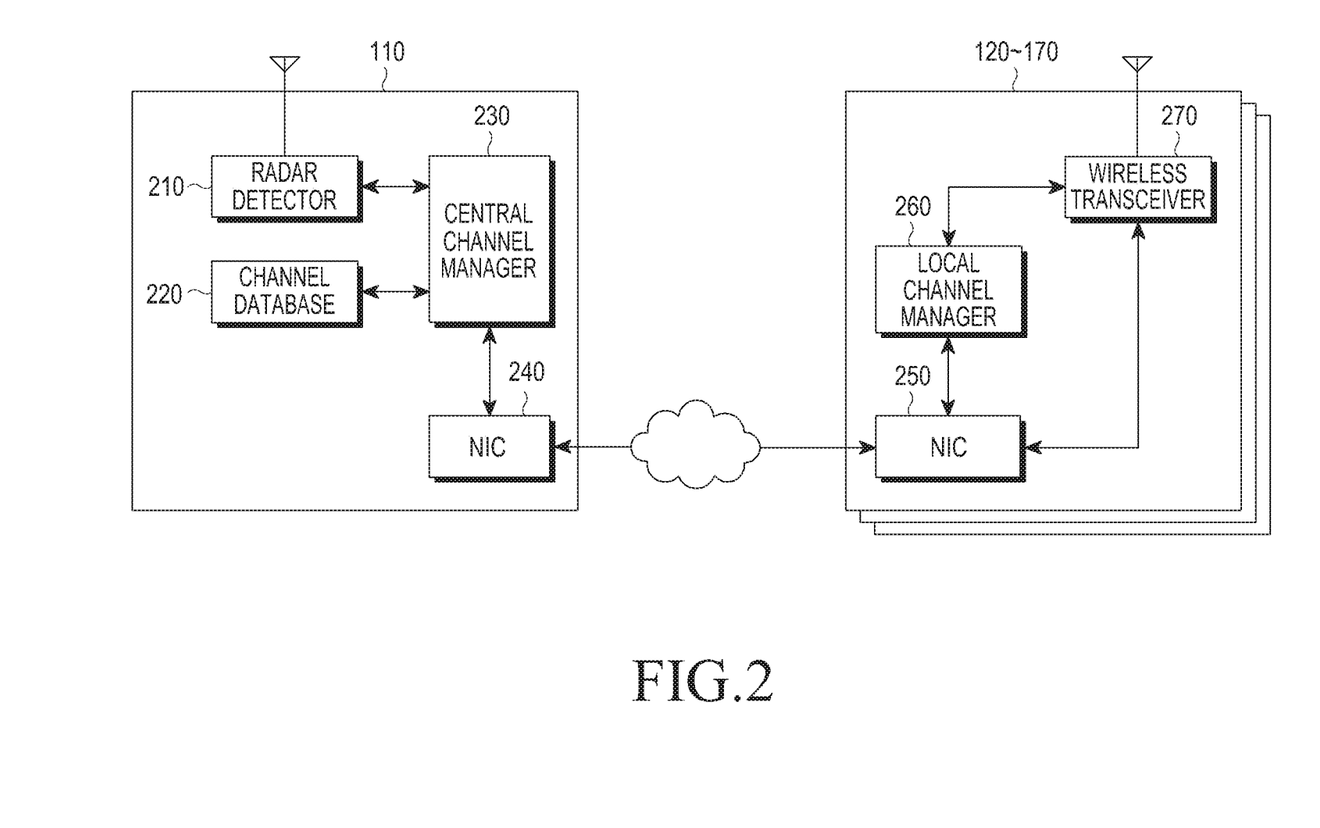
FIG. 2 is a view illustrating configurations of a WLAN AP and a centered remote channel monitor in a WLAN system according to an embodiment of the disclosure.

FIG. 2 is a view illustrating configurations of a WLAN AP and a centered remote channel monitor in a WLAN system according to an embodiment of the disclosure.

Referring to FIG. 2, a centered remote channel monitor 110 includes a radar detector 210, a channel database 220, a central channel manager 230, and a network interface card (NIC) 240. The above components are intended merely for illustration purposes, and they are not necessarily physically separated from each other. It should be appreciated that the above components are implemented in the centered remote channel monitor.

The radar detector 210 functions to detect radar signals in compliance with the DFS requirements of each country. The radar detector 210 may simultaneously detect radar signals on all the wireless channels in the DFS band.

The radar detector 210 ceaselessly checks if a radar signal is detected on a target channel, and upon detecting a radar signal with a strength not less than a threshold, the radar detector 210 notifies the central channel manager 230 of the detection.

The channel database 220 records the availability of each channel depending on whether a radar signal exists, and if unavailable, the remaining NO time or CAC time information. Further, the channel database 220 records the channel number that each WLAN AP is using from channel information that the WLAN APs obtain and send to the centered remote channel monitor, and the channel database 220 also records the connections between the WLAN APs in the form of a graph.

The central channel manager 230 determines the optimal channel to which each WLAN AP is supposed to switch using the channel database 220 when the radar detector 210 detects a radar signal. Such determinations are transmitted via the NICs 240 and 250 and the network to a local channel manager 260 of each WLAN AP 120 to 170.

The local channel manager 260 in each WLAN AP functions to determine the optimal channel among the channels of the non-DFS band when the WLAN AP fails to discover the central channel manager. The local channel manager 260 also performs an actual channel switch to the optimal channel that has been received together with the notification for the channel switch as per the detection of a radar signal from the central channel manager of the centered remote channel monitor. In this case, the local channel manager 260 may use the optimal channel, as it is, which has been received from the central channel manager 230. However, where the central channel manager 230 notifies of a plurality of optimal channels, the local channel manager 260 may determine one of the plurality of channels. Alternatively, the local channel manager 260 may simply refer to the optimal channel from the central channel manager 230 and choose a channel by an independent channel selection algorithm.

A wireless transceiver 270 in each WLAN AP may perform communication with UEs associated therewith and may come with the radio frequency (RF), physical (PHY), and media access control (MAC) features or functions that general WLAN systems have. The wireless transceiver 270 may change its operating channels depending on a determination by the local channel manager 260.

Figure 3:
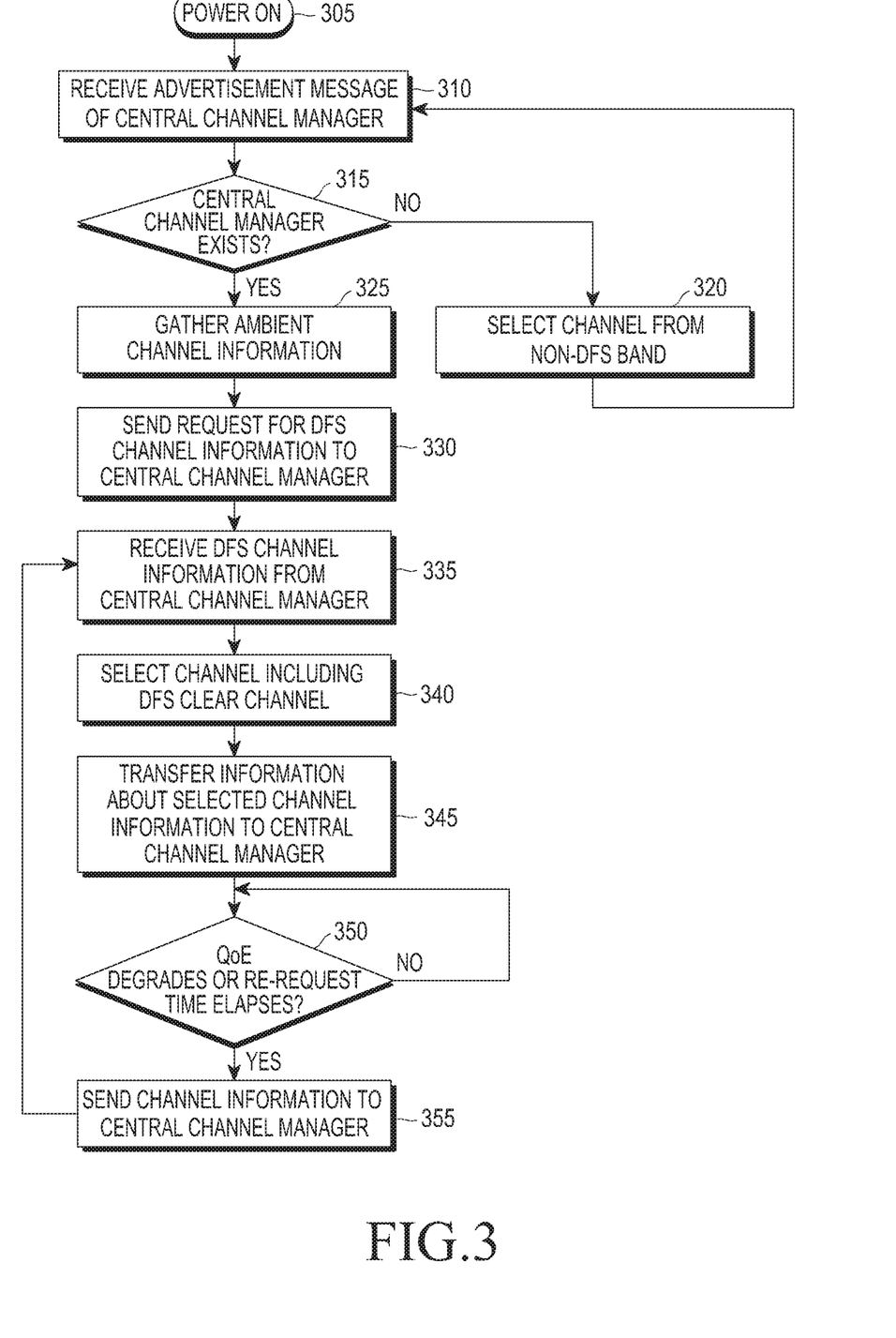
FIG. 3 is a flowchart illustrating operations upon power-on in a WLAN AP according to an embodiment of the disclosure.

FIG. 3 is a flowchart illustrating operations when a WLAN AP powers on according to an embodiment of the disclosure.

Referring to FIG. 3, when the WLAN AP powers on in operation 305, the WLAN AP goes to operation 310, receiving advertisement messages that the centered remote channel monitor periodically broadcasts. The advertisement message may function to notify the WLAN AP of the presence of a centered remote channel monitor and the advertisement message may include information (e.g., access address) necessary when the WLAN AP accesses the centered remote channel monitor. The advertisement message may include and carry a public key-based signature for authentication purposes.

In operation 315, the WLAN AP identifies whether a centered remote channel monitor is by receiving the advertisement message. Where there is no centered remote channel monitor accessible, the WLAN AP determines (or selects) a channel by its own algorithm in a non-DFS band in operation 320.

Where the WLAN AP is aware of (or identifies) the presence of a centered remote channel monitor by receiving the advertisement message, the WLAN AP may use a WLAN channel in the DFS band with the aid of the centered remote channel monitor. In other words, upon discovering a centered remote channel monitor accessible, the WLAN AP gathers ambient channel information in operation 325. Here, the channel information may include an AP identification (ID), a channel number, etc. This process is the same as the passive scanning process that normal WLAN terminals do to discover a WLAN AP. In other words, the WLAN AP receives beacon messages (or beacon frames) broadcast from the ambient WLAN APs while circulating through the WLAN channels and obtains information about the ambient WLAN APs. As a result of the discovery, the WLAN AP may be aware of the WLAN AP that is being operated on each channel and the signal strength with respect to the WLAN AP. Operation 325 may be performed concurrently or prior to operation 310 or 315 to reduce a delay during the discovery time.

The WLAN AP sends a request for channel information to the centered remote channel monitor in operation 330. The request message for the channel information may include information about the WLAN AP being operated on each channel and the signal strength with respect to the WLAN AP which are gathered in operation 325.

In response to the request, the WLAN AP receives channel information from the centered remote channel monitor in operation 335. The channel information may basically include channel numbers of the DFS band that may immediately come in availability. The channel numbers may be provided in the form of a list. The channel information may include the respective priorities of the channels of the DFS band immediately available which are determined by the centered remote channel monitor. The priorities may be provided in the form of a list. The channel information may also include CAC time information for channels of the DFS band that are currently unavailable. The WLAN AP may be avoided from sending out unnecessary requests when DFS channel information is needed in the future due to, e.g., a deterioration of quality of experience (QoE) based on the CAC time information. The channel information may include the respective priorities of the channels of the non-DFS band which are determined by the centered remote channel monitor.

In operation 340, the WLAN AP determines the optimal channel targeting the WLAN channels of the DFS band available and the WLAN channels of the non-DFS band as soon as it receives the channel information in operation 335. The optimal channel may be determined by the WLAN AP's own algorithm or based on the priorities determined by the centered remote channel monitor.

In operation 345, the WLAN AP transfers the selected WLAN AP channel information to the central channel manager of the centered remote channel monitor.

In operation 350, the WLAN AP identifies whether the state of the channel being currently operated meets a predetermined QoE standard or whether the CAC time in the DFS channel information received in operation 335 elapses. Where the state of the channel being currently operated fails to meet the predetermined QoE standard or the CAC time in the received DFS channel information elapses, the WLAN AP may again send a request for channel information to the centered remote channel monitor in operation 355 and receive a response from the centered remote channel monitor, thereby achieving an enhancement in the quality of the WLAN network by changing channels.

Figure 4:
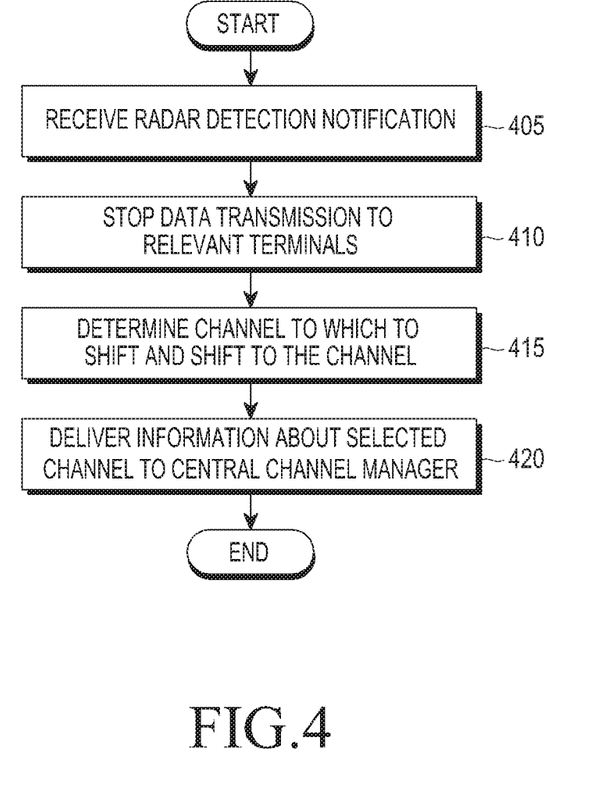
FIG. 4 is a flowchart illustrating operations when a WLAN AP is notified of radar detection by a centered remote channel monitor according to an embodiment of the disclosure.

FIG. 4 is a flowchart illustrating operations when a WLAN AP is notified of radar detection by a centered remote channel monitor according to an embodiment of the disclosure.

Referring to FIG. 4, in operation 405, the WLAN AP receives a notification message for radar detection through the network from the centered remote channel monitor. The message may include channel numbers of the DFS band immediately available. The message may include the respective priorities of the channels of the DFS band immediately available which are determined by the centered remote channel monitor. The message may include the respective priorities of the channels of the non-DFS band which are recommended by the centered remote channel monitor.

Receiving the notification of radar detection from the centered remote channel monitor, the WLAN AP stops transmitting data to the associated WLAN terminals in operation 410. The stopping operation should be performed within the time determined as per each country's frequency regulations.

In operation 415, the WLAN AP determines a channel to which it is to switch while avoiding radar signals. The optimal channel may be selected by the WLAN AP's own algorithm or by referring to the priorities determined by the centered remote channel monitor. The WLAN AP performs a channel switch by transmitting channel switching announcement frames containing the determined channel information to the associated terminals. In operation 420, the WLAN AP transmits information about the channel which is determined and switched in operation 415 to the centered remote channel monitor. The channel information may basically include the number of the channel switched and may further include the WLAN AP being operated on each channel obtained by performing passive scanning on the channel and information about the signal strength with respect to the WLAN AP.

Such a scheme may also be possible that the centered remote channel monitor notifies the AP of the CAC success by push.

Figure 5:
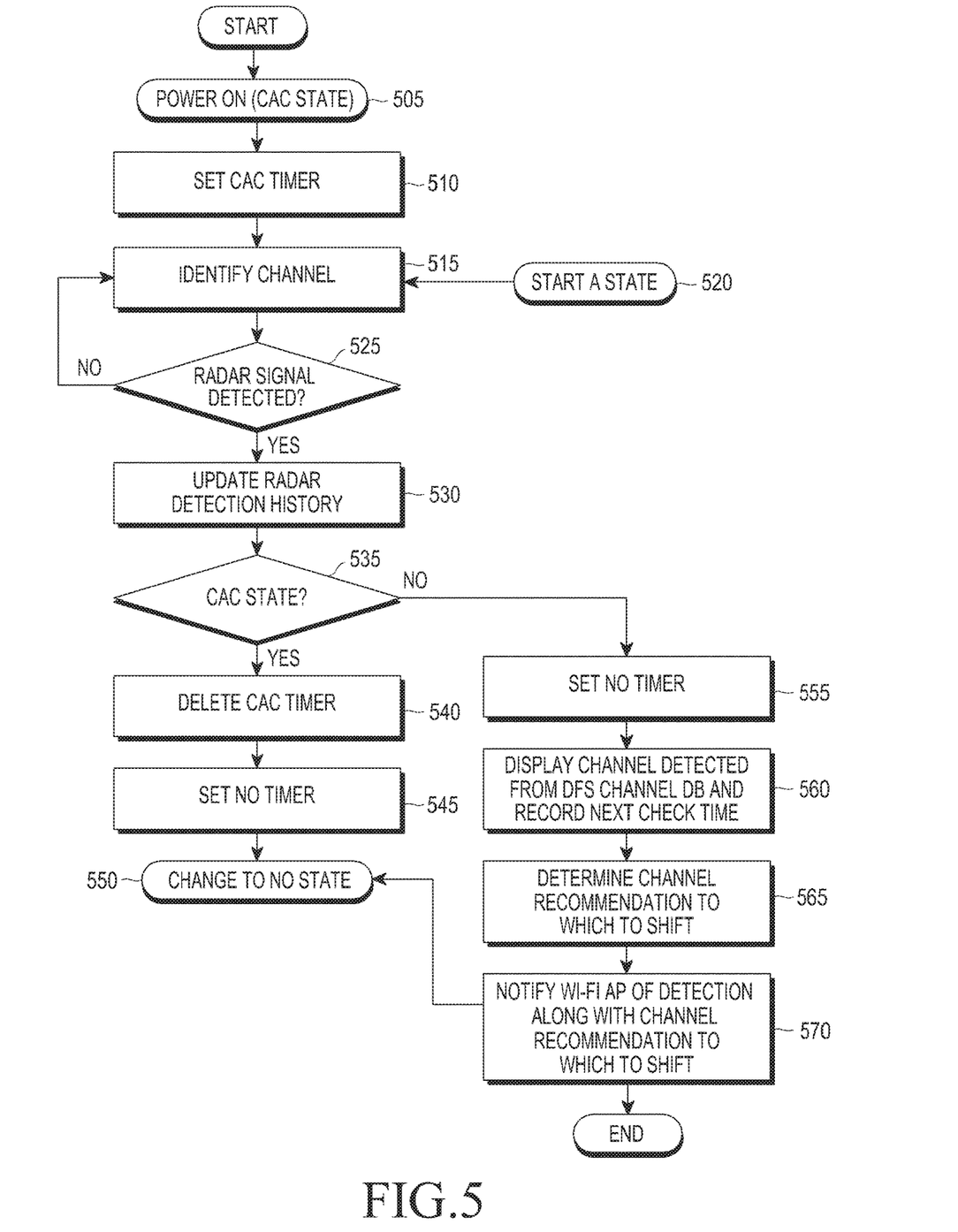
FIG. 5 is a flowchart illustrating operations when a centered remote channel monitor powers on and stays available according to an embodiment or the disclosure.

FIG. 5 is a flowchart illustrating operations when a centered remote channel monitor powers on and stays available according to an embodiment of the disclosure.

Figure 6:
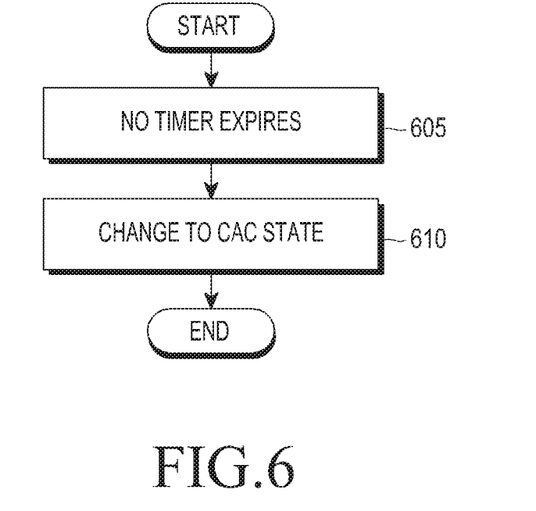
FIG. 6 is a flowchart illustrating operations when a NO timer expires a NO timer in a centered remote channel monitor according to an embodiment of the disclosure.
Figure 7:
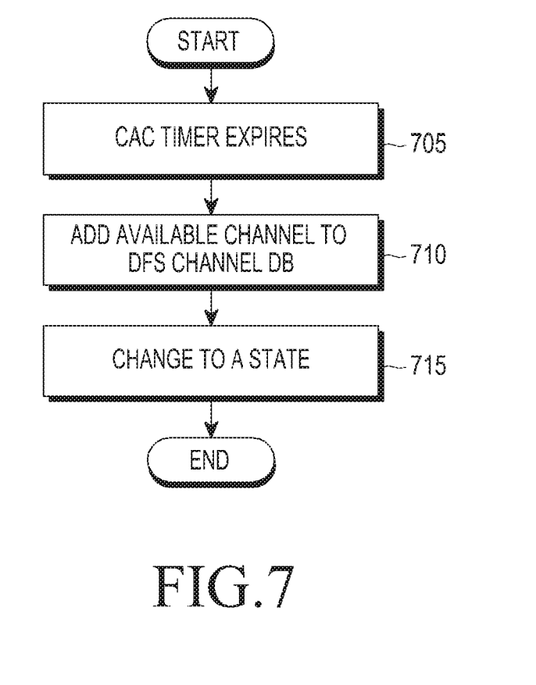
FIG. 7 is a flowchart illustrating operations when a CAC timer expires in a centered remote channel monitor according to an embodiment of the disclosure.

Referring to FIG. 5, the state of the centered remote channel monitor described in connection with FOGS. 5, 6, and 7 is set per WLAN channel of each DFS band, and thus, the respective operations of FIGS. 5, 6, and 7 are also performed independently and in parallel per channel.

It is assumed in operation 505 that the centered remote channel monitor is in the state of being powered on and channel availability check (CAC) state. Here, the CAC state corresponds to a state in which, prior to using the channel of the DFS band as per the DFS requirements, a radar signal is on the corresponding channel during the CAC time. To that end, the centered remote channel monitor sets up a CAC timer in operation 510. The CAC timer expires when no radar signal is detected on the channel for which the timer has been set during the CAC time. Conversely, where a radar signal is detected from the channel where the timer has been set during the CAC time, it is deleted.

In operations 515 to 525, the centered remote channel monitor identifies whether the channel has a radar signal with a strength not less than a threshold based on the frequency regulations. Where no radar signal is detected, the centered remote channel monitor goes back to operation 520, continuing to detect radar signals.

Where a radar signal is detected, the central channel manager records the current detection time in operation 530. The current detection time recorded may include, e.g., the hour on the day, date, and date.

Thereafter, a next operation is determined as per the current state of the centered remote channel monitor.

In operation 535, the centered remote channel monitor determines whether it is currently in the CAC state.

Where the centered remote channel monitor is currently in the CAC state, the centered remote channel monitor deletes the CAC timer set for the channel where a radar signal is detected in operation 540. In operation 545, the centered remote channel monitor sets the NO timer to expire after the NO time defined in the frequency regulations elapses, and the centered remote channel monitor changes the state of the centered remote channel monitor to the NO state in operation 550.

FIG. 6 is a flowchart illustrating operations when a NO timer expires a NO timer in a centered remote channel monitor according to an embodiment of the disclosure.

Referring to FIG. 6, in operation 605, where the NO timer set in operation 545 expires, the centered remote channel monitor may again identify the channel availability of the DFS band channel based on the frequency regulations, and when the condition is met, may use the channel. Accordingly, the centered remote channel monitor changes its state to the CAC state in operation 610.

FIG. 7 is a flowchart illustrating operations when a CAC timer expires in a centered remote channel monitor according to an embodiment of the disclosure.

Referring to FIG. 7, in operation 705, where the CA timer set in operation 510 expires, which means that no radar signal has been detected from the channel of interest during the CAC time, the centered remote channel monitor may use the channel based on the frequency regulations. In operation 710, the centered remote channel monitor updates the channel database 220 (DFS channel database) as the channel being immediately available. In operation 715, the centered remote channel monitor changes its state to the availability (A) state.

Again, operation 515 of FIG. 5 represents the start state of the A state. Although the channel is in the A state, the centered remote channel monitor may immediately use the channel. However, the centered remote channel monitor should ceaselessly monitor whether a radar signal is detected from the channel according to the frequency regulations (operations 515 to 525). Upon detecting a radar signal in the A state, the centered remote channel monitor goes to operation 555.

In operation 555, the centered remote channel monitor sets the NO timer to expire after the NO time. In operation 560, the centered remote channel monitor updates the channel database 220 (DFS channel database) as the channel being unavailable and records a next availability identifiable time as assistant information.

Before notifying the associated WLAN APs of the radar detection in operation 570, the centered remote channel monitor in operation 565 determines a channel recommendation to which it is to switch to and which is to be transferred to the associated WLAN APs. The centered remote channel monitor may simply deliver the detection or no of a radar signal, and each WLAN AP may locally determine the channel that the WLAN AP is to switch to while avoiding the radar signal. However, it is more advantageous to determine the optimal channel by the centered remote channel monitor that is aware of the interference and channel allocation with each WLAN AP. Where each WLAN AP is allowed to determine the channel, they may not determine the optimal channel. Further, since channel switching by a radar signal concurrently occurs in several WLAN APs, if multiple APs switches to one channel, channel congestion may arise, forcing the APs to switch to other channels. For example, ping-pong may happen.

The algorithm to determine a channel recommendation to which to switch in operation 565 is determined based on an inter-WLAN AP connection graph managed in the centered remote channel monitor.

As an example, the inter-WLAN AP connection graph may be represented as G=(V,E). Here, V is a set of the vertexes of the graph, and E is a set of the edges connecting between the vertexes. Neither a loop which is an edge starting from a vertex and curving back to itself nor connecting the vertexes to multiple edges is nor allowed. In the graph, V may be configured as a set of the WLAN APs, i.e., {Vi}, and E may be configured as the union of sets {Vk,Vl} which are a pair of WLAN APs connectable with each other (in other words, interferable with each other). Next, a set of WLAN channels allocatable may be defined as F. F is determined as per specific WLAN specifications or per-country frequency regulations. As an example, in a WLAN band of 2.4 GHz, F={1, 2, . . . , 14}. Where only non-overlapping channels are allocated, F={1, 6,11}.

Now, the algorithm to determine a channel recommendation to which to switch using the connection graph G between the WLAN APs may be regarded as mapping the channel free from inter-WLAN AP interference to V based on the WLAN channel set F, and this is similar to typical graph coloring. The typical graph coloring is known to be difficult to calculate within the polynomial time. There have been suggested several heuristic algorithms that may be carried out within the polynomial time. Determining a channel recommendation to which to switch may be addressed by the following heuristic algorithm.

Step 1-Releases the channel allocation of the vertext corresponding to the WLAN AP that is using the WLAN channel where a radar signal has currently been detected.

Step 2-Selects the vertex whose neighbor vertexes have been assigned most different WLAN channels among vertexes that are assigned no channel Where there are two or more such vertexes, the one with more neighbor vertexes assigned no WLAN channel is selected.

Step 3-First assigns the selected vertex with the channel of the non-DFS band among the channels not overlapping the neighbor vertexes. Where all of the channels of the non-DFS band are allocated, the channel is chosen and assigned which has the latest next detection time as predicted given the radar signal detection history.

Figure 9:
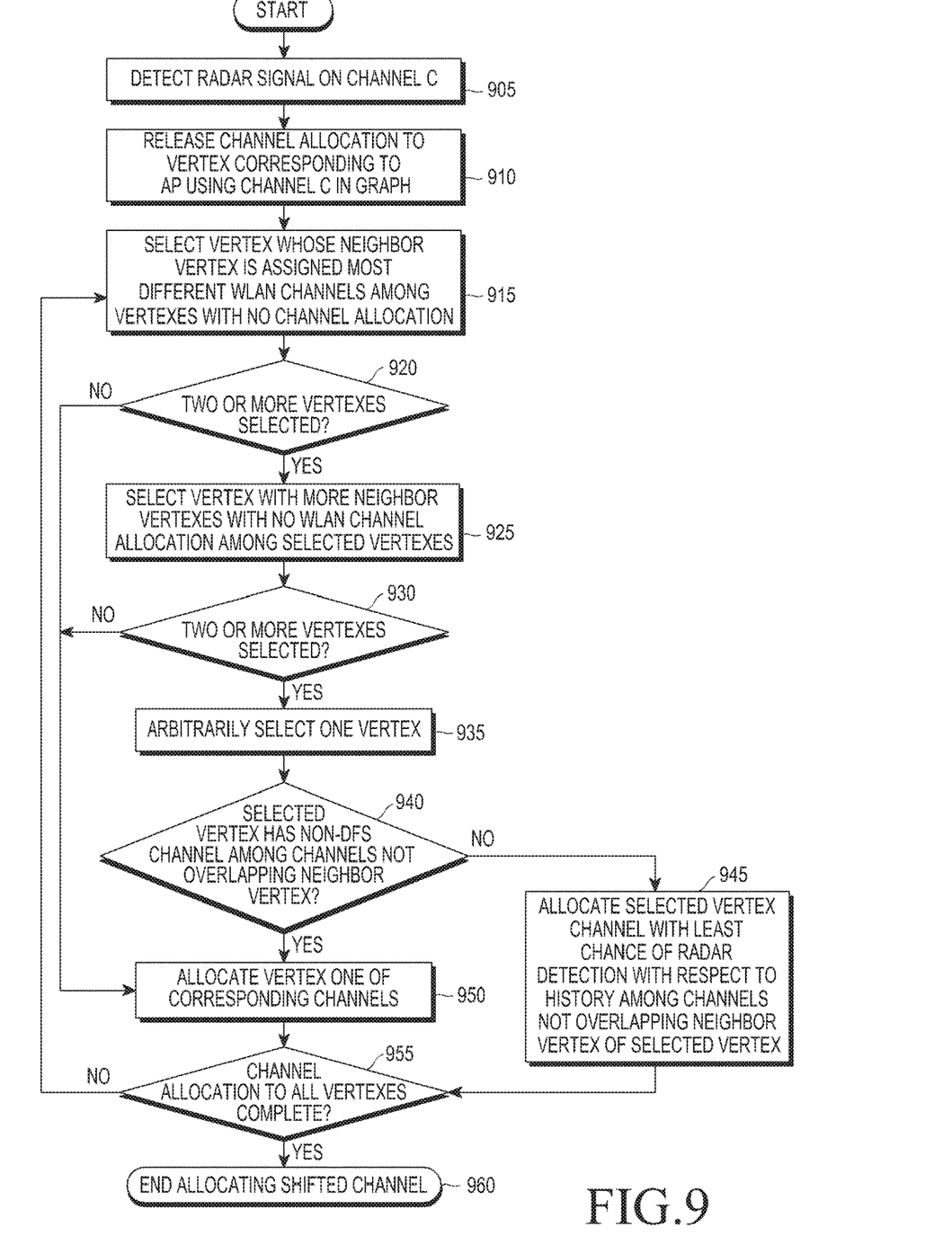
FIG. 9 is a flowchart illustrating a method for determining a channel to which to switch according to an embodiment of the disclosure.

Steps 2 and 3 above are repeated until channels are assigned to all the vertexes. FIG. 9 illustrates steps 1 to 3.

In operation 570, the centered remote channel monitor transmits notification messages for radar detection to the WLAN APs that are using the channels where radar signals are detected. At this time, the centered remote channel monitor provides the channel recommendation determined in operation 565 together with the message and changes to the NO state.

Figure 8:
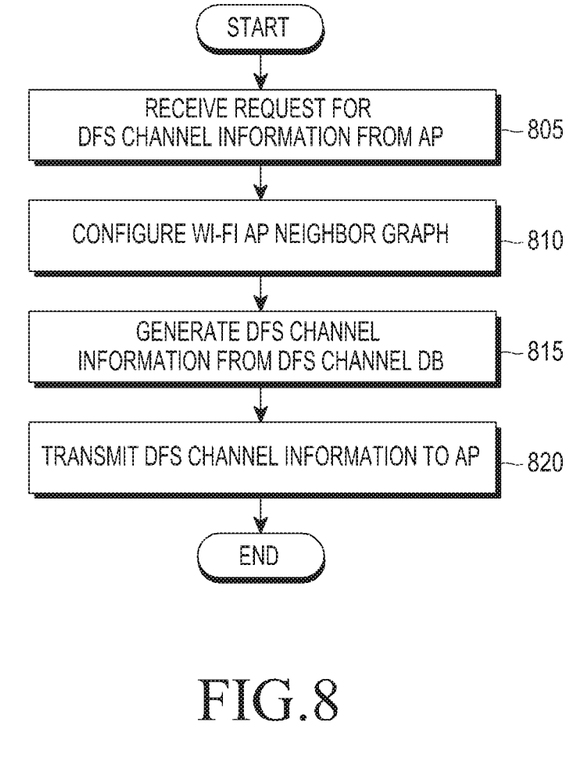
FIG. 8 is a flowchart illustrating operations when a centered remote channel monitor receives a request message for channel information from a WLAN AP according to an embodiment of the disclosure.

FIG. 8 is a flowchart illustrating operations when a centered remote channel monitor receives a request message for channel information from a WLAN AP according to an embodiment of the disclosure.

Referring to FIG. 8, in operation 805, the centered remote channel monitor receives a request message for channel information from the WLAN AP. The message may include ambient channel information obtained by the WLAN AP (information about the other WLAN APs on the channel and the signal strength with respect to the WLAN APs, see operations 325 to 330). The channel information may be determined based on channel allocation information indicating information regarding the channel switch of the AP and the radar signal detected from the centered remote channel monitor. In operation 810, the centered remote channel monitor updates the WLAN AP connection graph (if there is no such graph, generates) using the channel information.

In operation 815, channel information to be provided from the channel database 220 to the WLAN AP is processed. The channel information may basically include channel numbers of the DFS band that may immediately come in availability. The channel information may include the respective priorities of the channels of the DFS band immediately available which are determined by the centered remote channel monitor. The channel information may also include CAC time information for channels of the DFS band that are currently unavailable. The WLAN AP may be avoided from sending out unnecessary requests when DFS channel information is needed in the future due to, e.g., a deterioration of quality of experience (QoE) based on the CAC time information. The channel information may include the respective priorities of the channels of the non-DFS band which are determined by the centered remote channel monitor.

In operation 820, the centered remote channel monitor sends a message with the processed channel information through the network to the WLAN AP in response to the request message that the WLAN AP has transmitted in operation 810.

FIG. 9 is a flowchart illustrating a method for determining a channel to which to switch according to an embodiment of the disclosure.

Referring to FIG. 9, in operation 905, the centered remote channel monitor detects a radar signal corresponding to channel c among channels a, b, c, . . . . In operation 910, the centered remote channel monitor releases the channel allocation of the vertex corresponding to the WLAN AP that is using channel c in the graph.

In operation 915, the centered remote channel monitor selects the vertex whose neighbor vertex is assigned most different WLAN channels among the vertexes assigned no channel. In operation 920, the centered remote channel monitor determines whether two or more vertexes are selected. Where two or more vertexes are selected, the centered remote channel monitor selects the vertex with more vertexes assigned no WLAN channel among the vertexes selected in operation 925. Thereafter, in operation 930, the centered remote channel monitor determines whether two or more vertexes are selected. Where there are two or more vertexes selected, the centered remote channel monitor selects any one of the vertexes in operation 935. In operation 940, the centered remote channel monitor determines whether the selected vertex has a non-DFS channel among the channels not overlapping the neighbor vertex. Where the channels have a non-DFS channel, the centered remote channel monitor assigns one of the channels to the vertex in operation 950. In operation 955, the centered remote channel monitor determines whether the allocation of channels to all the vertexes is complete. Where the channel allocation is complete, the centered remote channel monitor performs operation 960, ending the allocation of the switched channel Unless the channel allocation is complete, the centered remote channel monitor returns to operation 915.

Meanwhile, unless there are two or more vertexes selected in operation 920 or 930, the centered remote channel monitor may immediately perform operation 950, assigning one of the channels to the vertex.

Where there is no non-DFS channel in operation 940, the centered remote channel monitor goes to operation 945 to assign the selected vertex with the channel with the lowest chance of radar detection with respect to the history among the channels not overlapping the neighbor vertex.

The disclosure enables a simultaneous monitoring of a number of DFS channels and an immediate switch to the optimal channel considering neighbor APs and encompassing other DFS channels free of a radar signal upon detecting a radar signal. In this disclosure, the centered remote channel monitor may recommend a channel to which to switch by a centralized algorithm and distribute the load. Since the centered remote channel monitor is detection-dedicated hardware, the likelihood of false alert is likely to be lowered. The disclosure enables a buildup of a DFS channel-available WLAN system with low-cost WLAN APs free of a radar detector and enabling immediate use of DFS channels after the Wi-Fi router resets.

Figure 10:
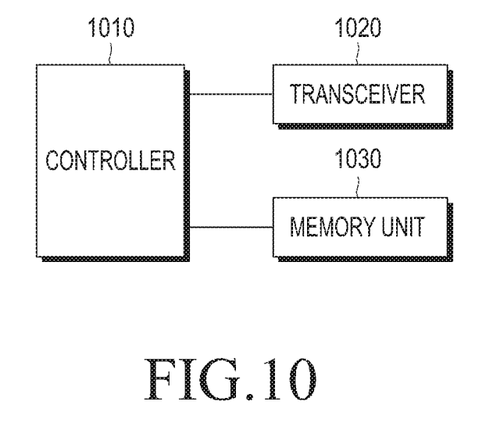
FIG. 10 is a block diagram illustrating a configuration of a channel management monitor according to an embodiment of the disclosure.

FIG. 10 is a block diagram illustrating a configuration of a channel management monitor according to an embodiment of the disclosure.

Referring to FIG. 10, a channel management monitor includes a transceiver 1020, a memory 1030, and a controller 1010.

The transceiver 1020 includes a transmission module and a reception module to transmit and receive data to/from an AP according to an embodiment of the disclosure.

The controller 1010 performs the operations of the centered remote channel monitor described above in connection with FIGS. 1, 2, and 5 to 8.

The memory 1030 stores various data of the centered remote channel monitor.

Figure 11:
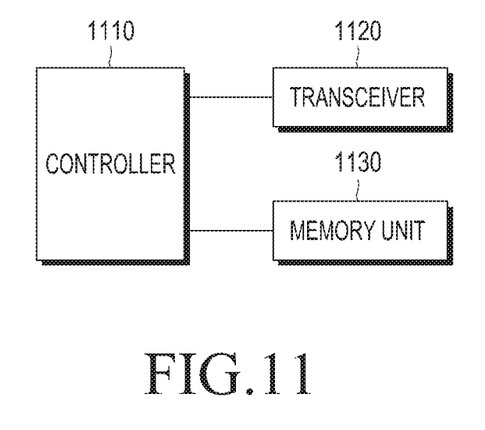
FIG. 11 is a block diagram illustrating a configuration of an AP according to an embodiment of the disclosure.

FIG. 11 is a block diagram illustrating a configuration of an AP according to an embodiment.

Referring to FIG. 11, an AP includes a transceiver 1120, a memory 1130, and a controller 1110.

The transceiver 1120 includes a transmission module and a reception module to transmit and receive data to/from the centered remote channel monitor according to an embodiment of the disclosure.

The controller 1110 performs the operations of the AP described above in connection with FIGS. 1, 2, 3, and 4.

The memory 1030 stores various data of the AP.

It should be noted that the examples, signal flows, and block components shown in FIGS. 1 to 9 are not intended to limit the scope of the disclosure. In other words, all the information, fields, components or operations illustrated in FIGS. 1 to 9 should not be construed as essential components to practice the disclosure, and the disclosure may be rather implemented with only some of the components without departing from the gist of the disclosure.

The above-described operations may be realized by equipping a memory device retaining their corresponding codes in any component of an entity, function, base station, terminal, or vehicular device in a communication system. For example, the controller in the entity, function, base station, terminal, or the vehicular device may execute the above-described operations by reading and running the program codes stored in the memory device by a processor or central processing unit (CPU).

As described herein, various components or modules in the entity, function, base station, terminal, or vehicular device may be operated using a hardware circuit, e.g., a complementary metal oxide semiconductor (CMOS)-based logic circuit, firmware, software, and/or using a hardware circuit, such as a combination of hardware, firmware, and/or software embedded in a machine-readable medium. As an example, various electric structures and methods may be executed using electric circuits, such as transistors, logic gates, or ASICs.

Certain aspects of the present disclosure can also be embodied as computer readable code on a non-transitory computer readable recording medium. A non-transitory computer readable recording medium is any data storage device that can store data which can be thereafter read by a computer system. Examples of the non-transitory computer readable recording medium include a Read-Only Memory (ROM), a Random-Access Memory (RAM), Compact Disc-ROMs (CD-ROMs), magnetic tapes, floppy disks, and optical data storage devices. The non-transitory computer readable recording medium can also be distributed over network coupled computer systems so that the computer readable code is stored and executed in a distributed fashion. In addition, functional programs, code, and code segments for accomplishing the present disclosure can be easily construed by programmers skilled in the art to which the present disclosure pertains.

At this point it should be noted that the various embodiments of the present disclosure as described above typically involve the processing of input data and the generation of output data to some extent. This input data processing and output data generation may be implemented in hardware or software in combination with hardware. For example, specific electronic components may be employed in a mobile device or similar or related circuitry for implementing the functions associated with the various embodiments of the present disclosure as described above. Alternatively, one or more processors operating in accordance with stored instructions may implement the functions associated with the various embodiments of the present disclosure as described above. If such is the case, it is within the scope of the present disclosure that such instructions may be stored on one or more non-transitory processor readable mediums. Examples of the processor readable mediums include a ROM, a RAM, CD-ROMs, magnetic tapes, floppy disks, and optical data storage devices. The processor readable mediums can also be distributed over network coupled computer systems so that the instructions are stored and executed in a distributed fashion. In addition, functional computer programs, instructions, and instruction segments for accomplishing the present disclosure can be easily construed by programmers skilled in the art to which the present disclosure pertains.

As is apparent from the foregoing description, according to the disclosure, there are provided a method and an apparatus for managing channels in a WLAN system using a centered remote channel monitor in a communication system using a DFS band.

According to the disclosure, there are provided a method and an apparatus for managing channels in a WLAN system that may take advantage of a DFS band in a low-cost and efficient way.

Effects of the disclosure are not limited to the foregoing, and other unmentioned effects would be apparent to one of ordinary skill in the art from the following description.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method for managing a channel on an access point (AP) in a wireless local area network (WLAN) system, the method comprising:
   receiving advertisement information informing a presence of a channel monitor responsible for managing the AP and detecting a radar signal, the advertisement information including information related to access to the channel monitor;
   identifying whether the channel monitor is accessible based on the advertisement information;
   in case that the channel monitor is accessible:
      send a request for channel information to the channel monitor,
      receive the channel information indicating a channel switch of the AP,
      select one from a first channel in a non-dynamic frequency selection (non-DFS) band and a second channel that is available in a DFS band based on the channel information, and
      transmit information on the selected channel to the channel monitor; and
   in case that the channel monitor is not accessible:
      select the first channel available for communicating with a client device in a non-DFS band,
   wherein the channel information includes information of available second channel in the DFS band and channel availability check time information for channels that are currently unavailable in the DFS band, and priority information for each of the at least one second channel, and
   wherein the DFS band is a WLAN band available for transmission of the radar signal and the non-DFS band is a WLAN band not overlapping with the DFS band.

2. The method of claim 1, wherein the channel information is determined based on ambient channel information.

3. The method of claim 2, wherein the ambient channel information includes a channel number.

4. The method of claim 1, wherein the channel information is determined based on a DFS channel having the radar signal and another DFS channel lacking the radar signal.

5. A method for managing a channel on a channel monitor in a wireless local area network (WLAN) system, the method comprising:
   transmitting advertisement information informing a presence of a channel monitor responsible for managing an access point (AP) and detecting a radar signal, the advertisement information including information related to access to the channel monitor;
   receiving a request for channel information from the AP;
   transmitting the channel information indicating a channel switch of the AP to the AP; and
   receiving, from the AP, information on a selected channel based on the channel information, the selected channel being one from a first channel in a non-dynamic frequency selection (non-DFS) band and a second channel in a DFS band,
   wherein the first channel is a channel available in the non-DFS band, and the second channel is a channel available in the DFS band,
   wherein the channel information includes information of available second channel in the DFS band and channel availability check time information for channels that are currently unavailable in the DFS band, and priority information for each of the at least one second channel, and
   wherein the DFS band is a WLAN band available for transmission of the radar signal and the non-DFS band is a WLAN band not overlapping with the DFS band.

6. The method of claim 5, wherein the channel information is determined based on ambient channel information.

7. The method of claim 6, wherein the ambient channel information includes a channel number.

8. The method of claim 5, wherein the channel information is determined based on a DFS channel having the radar signal and another DFS channel lacking the radar signal.

9. An apparatus for managing a channel on an access point (AP) in a wireless local area network (WLAN) system, the apparatus comprising:
a transceiver configured to transmit or receiver data; and
at least one processor configured to:
receive, through the transceiver, advertisement information informing a presence of a channel monitor responsible for managing the AP and detecting a radar signal, the advertisement information including information related to access to the channel monitor;
identify whether the channel monitor is accessible based on the advertisement information; and
in case that the channel monitor is accessible:
send a request for channel information to the channel monitor,
receive the channel information indicating a channel switch of the AP,
select one from a first channel in a non-dynamic frequency selection (non-DFS) band and a second channel that is available in a DFS band, based on the channel information, and
transmit, through the transceiver, information on the selected channel to the channel monitor, and
in case that the channel monitor is not accessible:
select a first channel available for communicating with a client device in a non-DFS band,
wherein the channel information includes information of available second channel in the DFS band and channel availability check time information for channels that are currently unavailable in the DFS band, and priority information for each of the at least one second channel, and
wherein the DFS band is a WLAN band available for transmission of the radar signal and the non-DFS band is a WLAN band not overlapping with the DFS band.

10. The apparatus of claim 9,
wherein the channel information is determined based on ambient channel information, and
wherein the ambient channel information includes a channel number.

11. The apparatus of claim 9,
wherein the channel information is determined based on a DFS channel having the radar signal and another DFS channel lacking the radar signal.

12. An apparatus for managing a channel on a channel monitor in a wireless local area network (WLAN) system, the apparatus comprising:
a transceiver configured to transmit or receiver data; and
at least one processor configured to:
transmit, through the transceiver, advertisement information informing a presence of a channel monitor responsible for managing an access point (AP) and detect a radar signal, the advertisement information including information related to access to the channel monitor,
receive a request for channel information from the AP,
transmit, through the transceiver, the channel information indicating a channel switch of the AP to the AP, and
receive, through the transceiver from the AP, information on a selected channel based on the channel information, the selected channel being from of a first channel in a non-dynamic frequency selection (non-DFS) band and a second channel in a DFS band,
wherein the first channel is a channel available in the non-DFS band, and the second channel is a channel available in the DFS band,
wherein the channel information includes information of available second channel in the DFS band and channel availability check time information for channels that are currently unavailable in the DFS band, and priority information for each of the at least one second channel, and
wherein the DFS band is a WLAN band available for transmission of the radar signal and the non-DFS band is a WLAN band not overlapping with the DFS band.

13. The apparatus of claim 12,
wherein the channel information is determined based on ambient channel information, and
wherein the ambient channel information includes a channel number.

14. The apparatus of claim 12, wherein the channel information is determined based on a dynamic frequency selection (DFS) channel having the radar signal and another DFS channel lacking the radar signal.

* * * * *